(12) United States Patent
Cheshire (10) Patent No.: US 9,998,321 B2
(45) Date of Patent: Jun. 12, 2018

(54) METHOD AND APPARATUS FOR SUPPORTING DUPLICATE SUPPRESSION WHEN ISSUING MULTICAST QUERIES USING DNS-FORMAT MESSAGE PACKETS

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2888 days.

(21) Appl. No.: 10/102,174

(22) Filed: Mar. 19, 2002

(65) Prior Publication Data

US 2003/0182269 A1 Sep. 25, 2003

(51) Int. Cl.
*H04L 29/12* (2006.01)

(52) U.S. Cl.
CPC .... *H04L 29/12132* (2013.01); *H04L 61/1511* (2013.01); *H04L 61/1552* (2013.01)

(58) Field of Classification Search
USPC ............ 370/401, 432; 707/1–10, 100–104.1, 707/200–206; 709/229, 313, 245, 709/219–225
See application file for complete search history.

(56) References Cited

U.S. PATENT DOCUMENTS

| | | | | |
|---|---|---|---|---|
| 6,081,805 | A * | 6/2000 | Guha | |
| 6,332,158 | B1 * | 12/2001 | Risley et al. | 709/219 |
| 6,356,892 | B1 * | 3/2002 | Corn et al. | 707/3 |
| 6,539,022 | B1 * | 3/2003 | Virgile | 370/401 |
| 6,584,464 | B1 * | 6/2003 | Warthen | 707/4 |
| 6,643,707 | B1 * | 11/2003 | Booth | H04L 12/18 709/245 |
| 6,701,329 | B1 * | 3/2004 | Esibov et al. | 707/201 |
| 6,748,374 | B1 * | 6/2004 | Madan et al. | 707/3 |
| 7,143,187 | B1 * | 11/2006 | Takeda | H04L 29/06 709/245 |
| 2002/0103931 | A1 * | 8/2002 | Mott | H04L 12/4641 709/245 |
| 2002/0165854 | A1 * | 11/2002 | Blayvas et al. | 707/3 |

(Continued)

OTHER PUBLICATIONS

"1035 Memo" by the Network Working Group; http://www.ietf.org/rfc/rfc1035; P. Mockapetris; Nov. 1987 (Herein disclosed as 1035).*

(Continued)

*Primary Examiner* — Ashish K Thomas
*Assistant Examiner* — Mellissa M Ohba
(74) *Attorney, Agent, or Firm* — Sterne, Kessler, Goldstein & Fox P.L.L.C.

(57) ABSTRACT

Domain Name System (DNS) Queries and DNS Responses both use the same packet format. The DNS packet format includes a header section, a question section, an answer section, an authority record section and an additional record section. In conventional DNS Queries, the header section and the question section are used; the answer section, authority record section and additional record section are empty. In the present invention, when issuing a query, the client places the question in the question section as usual, and places all the answers it already knows into the (previously empty) answer section. When receiving a query, a responder checks to make sure that the answer it is about to give is not already included in the answer section. If the answer is listed in the answer section of the query, it means that the client already has that information, and doesn't need to be told again.

54 Claims, 2 Drawing Sheets (56) References Cited

U.S. PATENT DOCUMENTS

2002/0178238 A1* 11/2002 Fletcher et al. .............. 709/220
2004/0039798 A1*  2/2004 Hotz ................. H04L 29/12066
                                                           709/219
2004/0073707 A1*  4/2004 Dillon .......................... 709/245

OTHER PUBLICATIONS

"1034 Memo" by the Network Working Group; http://www.ietf.org/rfc/rfc1034; P. Mockapetris; Nov. 1987 (Herein disclosed as 1034).*
Sidhu, Gursharan S. et al., "Inside AppleTalk", Second Edition, Apple Computer, Inc.,Third printing, Nov. 1991, chapter 2, pp. 2-1 to 2-12, ISBN 0-201-55021-0.
Guttman, E. et at., "Service Location Protocol, Version 2", Vinca Corporation, Jun. 1999, pp. 1-54, <http://tools.ietf.org/id/draft-cheshire-dnsext-nbp-07.txt>, downloaded Jan. 12, 2009.
Cheshire, Stuart et al., "Requirements for Replacing AppleTalk", pp. 1-22, Nov. 17, 2008, <http://www.ietf.org/rfc/rfc2608.txt>, downloaded Jan. 12, 2009.

* cited by examiner

METHOD AND APPARATUS FOR SUPPORTING DUPLICATE SUPPRESSION WHEN ISSUING MULTICAST QUERIES USING DNS-FORMAT MESSAGE PACKETS

BACKGROUND OF THE INVENTION

Field of the Invention

The present invention relates to computer networks. More specifically, the present invention relates to a method and an apparatus that supports suppression of multiple identical replies when issuing repeated multicast queries using DNS-format message packets.

Related Art

When a client is seeking information, and the source of the information is not known in advance, one common technique is to issue the query for that information using Internet Protocol (IP) Multicast, Ethernet Multicast, or some other technique that delivers the query to a set of machines that might potentially be able to provide that information. In some cases, more than one machine may have information to give in response to the query, resulting in multiple responses on the network. Furthermore, because packet-switching network technologies may occasionally lose or corrupt packets, it is customary for clients issuing such queries to transmit those query packets more than once, and combine the results, to reduce the risk that any particular query or response may be lost. When each multicast query can result in a large number of responses on the network, this can be inefficient.

What is needed is a method and an apparatus that allows a client to issue repeated multicast queries for the sake of reliability, without the inefficiency of receiving redundant identical replies every time.

BRIEF SUMMARY OF THE INVENTION

Domain Name System (DNS) Queries and DNS Responses both use the same packet format. The DNS packet format, defined by Internet Engineering Task Force (IETF) Protocol Standard 13 (RFC 1035) includes a header section, a question section, an answer section, an authority record section and an additional record section. In conventional DNS Queries, the header section and the question section are used; the answer section, authority record section and additional record section are empty.

In the present invention, when issuing a query, the client places the question in the question section as usual, but then places all the answers it already knows into the (previously empty) answer section of the query. When receiving a query, a responder first checks to make sure that the answer it is about to give is not already included in the answer section of the query. If the answer is listed in the answer section of the query, it means that the client already has that information, and doesn't need to be told again. In this way, when a client issues its first multicast query, it may receive many responses. When the client issues a subsequent query, it indicates the list of responses it successfully received by listing them in the answer section, and then only receives responses that were missed the first time. In the normal course of operation, this means that by the second or third transmission of the query, no further responses are generated on the network, and the client can then issue occasional periodic queries without eliciting a flood of responses every time.

Hence, one embodiment of the present invention provides that for obtaining any information that may be represented using DNS Resource Records. The system operates by delivering a query asking for information identified by a DNS name, a query type and a query class to multiple entities. This query is contained within a packet that adheres to a format defined in Internet Engineering Task Force (IETF) RFC 1035. Moreover, the query includes an answer section containing a list of known answers to the query. In response to the query, the system receives zero or more responses to the query containing additional answers that are not in the list of known answers. This allows the system to add the additional answers to the list of known answers. Note that sending the list of known answers along with the query facilitates suppressing responses that include known answers.

In a variation on this embodiment, delivering the query involves performing a domain name system (DNS) multicast to deliver the query to the multiple entities.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Clients and Servers

Figure 1:
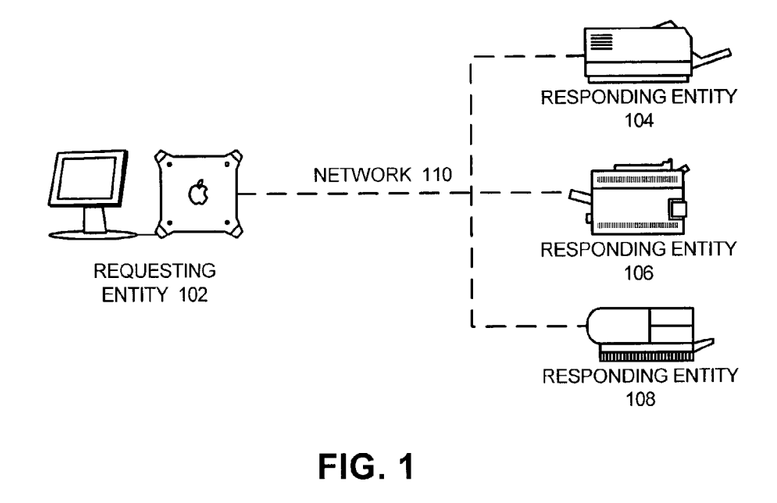
FIG. 1 illustrates a requesting entity coupled to a number of responding entities through a network in accordance with an embodiment of the present invention.

FIG. 1 illustrates a requesting entity 102 coupled to a number of responding entities 104, 106 and 108 through a network 110 in accordance with an embodiment of the present invention.

Network 110 can generally include any type of wire or wireless communication channel capable of coupling together computing nodes. This includes, but is not limited to, a local area network, a wide area network, or a combination of networks. In one embodiment of the present invention, network 110 includes the Internet.

Requesting entity 102 and responding entities 104, 106 and 108 reside on computing devices attached to network 110. These computing devices can generally include any type of computer system, including, but not limited to, a computer system based on a microprocessor, a mainframe computer, a digital signal processor, a portable computing device, a personal organizer, a device controller, and a computational engine within an appliance.

In the embodiment of the present invention illustrated in FIG. 1, requesting entity 102 is a personal computer system and responding entities 104, 106 and 108 are printers. However, note that responding entities, 106 and 108 can generally include any type of entity that can provide an answer to a query.

During operation, requesting entity 102 sends a query over network 110 to obtain information. This process is described in more detail below with reference to FIGS. 2-4.

Packet Structure

Figure 2:
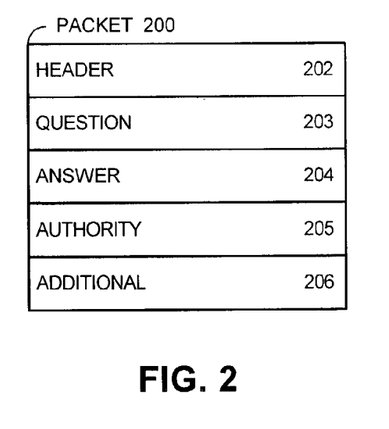
FIG. 2 illustrates a packet structure in accordance with an embodiment of the present invention.

FIG. 2 illustrates a packet structure for a standard protocol, such as DNS, in accordance with an embodiment of the present invention. As is illustrated in FIG. 2, packet 200 includes a number sections, including a header section 202, a question section 203, an answer section 204, an authority section 205 an additional section 206.

The header section 202 is always present. Header section 202 includes fields that specify which of the remaining sections are present, and whether the packet contains a query or a response. Header section 202 also contains an identifier for a query. Note that this identifier is included in any responses to the query.

Question section 203 carries the query name and other query parameters. Answer section 204 carries resource records which directly answer the query. Authority section 205 carries resource records that describe other authoritative servers. Finally, additional section 206 carries additional resource records, which may facilitate using resource records in other sections.

Note that in the DNS protocol, a packet that contains a question does not contain answer records. The present invention makes an unconventional use of answer records by including them in a question packet to identify known answers to the query. This unconventional use of answer records reduces network traffic because known responses containing known answers are not sent over network 110. Only answers that are not contained in the question record will trigger responses.

Resource Record Structure

Figure 3:
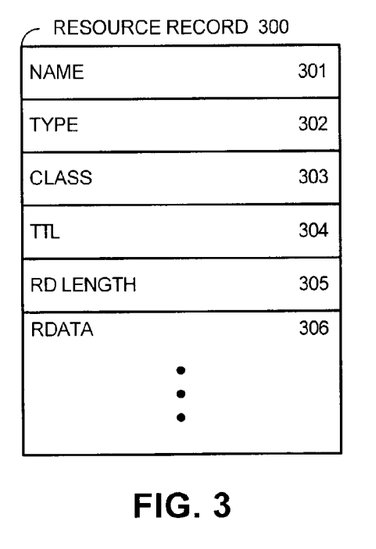
FIG. 3 illustrates a resource record structure in accordance with an embodiment of the present invention.

FIG. 3 illustrates a resource record structure for a protocol, such as DNS, in accordance with an embodiment of the present invention. In FIG. 3, resource record 300 includes a name field 301, a type field 302, a class field 303, a time-to-live (TTL) field 304, and resource data length field 305 and associated resource data 306. Name field 301 is an extensible field that contains a name. Type field 302 identifies a resource type. Class field 303 identifies a name space. Time-to-live (TTL) field 304 indicates how long the resource record is valid. Resource data length field 305 indicates the length of the following resource data 306. Resource data 306 is a variable length string that describes the resource. The format of this information varies according to the type and class of the resource information.

Example: Duplicate Suppression During Address Record Lookup

Figure 4:
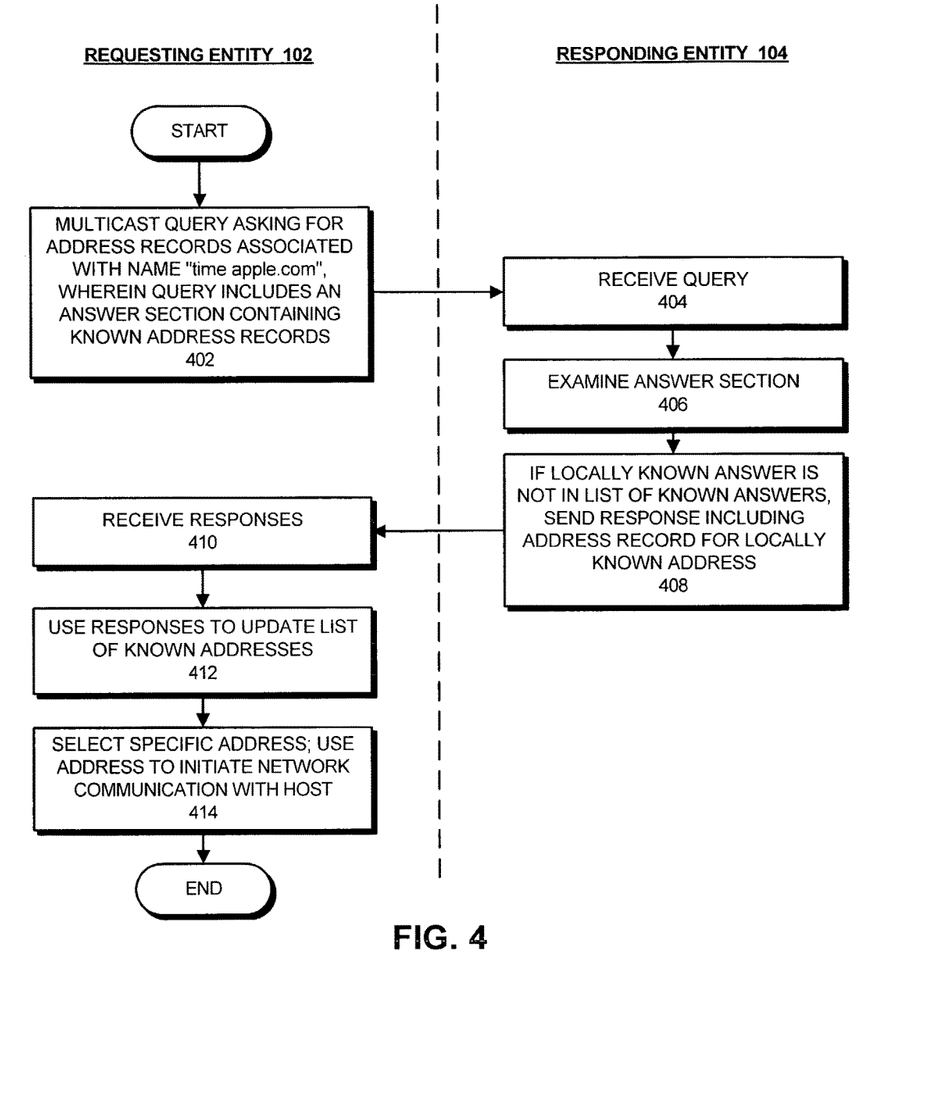
FIG. 4 is a flow chart illustrating lookup of the set of (zero or more) address records that match a given name, in accordance with an embodiment of the present invention.

In one example, the present invention supports duplicate suppression during address record lookup. FIG. 4 is a flow chart illustrating this process.

During operation, requesting entity 102 transmits a multicast query across network 110 asking for address record(s) associated with the name "time.apple.com." (step 402). This query includes an answer section containing a list of known address records that match that name.

Next, a responding entity 104 receives the query (step 404) and examines the answer section (step 406). If responding entity 104 contains a locally known answer that is not included in the list of known answers in the answer section, responding entity 104 sends a response to requesting entity 102 containing an address record for the locally known address (step 408).

Next, requesting entity 102 receives responses to the query (step 410) and uses the responses to update its list of known address (step 412).

Requesting entity 102 can then select a specific address from the list of known address to initiate network communication with that host (step 414).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method to obtain information that is represented using domain name system (DNS) resource records, at a requesting entity in a domain, comprising:
   multicasting a DNS request query asking for information identified by a DNS name, a query type and a query class as defined in IETF RFC 1035 from a computer system, wherein the query includes:
      a questions section containing the DNS name, the query type and the query class,
         wherein the query type indicates that the information contained in the query is of one of the following types:
            a host address,
            a canonical name of an alias,
            a CPU and OS used by a host,
            a mail exchange for the domain,
            an authoritative name server for the domain,
            a pointer to another part of the domain name space, or
            a start of the zone authority, and
         wherein the query class indicates a network protocol family or an instance of a network protocol,
      a non-empty answer section containing at least one answer to the request query known by the requesting entity, wherein the list of known answers includes known addresses which correspond to the DNS name in the question section of the request query;
   receiving at the computer system responses to the multicasted request query that contain additional answers that are not in the list of known answers, wherein the list of known answers is in the request query, and wherein a responding entity suppresses responses to queries that contain answers that are included in the list of known answers in the query; and
   adding the additional answers to the list of known answers;
   wherein sending the list of known answers along with the request query suppresses the known answers in the received responses.

2. The method of claim 1, wherein multicasting the request query involves performing a domain name system (DNS) multicast to send the request query to multiple entities.

3. The method of claim 1, wherein the domain comprises a computer network.

4. The method of claim 1, wherein the domain comprises a wireless computer network.

5. A computer-executable method to communicate information that is represented using DNS resource records, by a responding entity in a domain, comprising:
  receiving a multicast DNS request query asking for information identified by a DNS name, a query type and a query class as defined in IETF RFC 1035 from a requesting entity which belongs to a computer system, wherein the query includes:
    a question section containing the DNS name, the query type and the query class,
      wherein the query type indicates that the information contained in the query is of one of the following types:
        a host address,
        a canonical name of an alias,
        a CPU and OS used by a host,
        a mail exchange for the domain,
        an authoritative name server for the domain,
        a pointer to another part of the domain name space, or
        a start of the zone authority, and
      wherein the query class indicates a network protocol family or an instance of a network protocol,
    a non-empty answer section containing at least one answer to the query known by the requesting entity, wherein the list of known answers includes known addresses which correspond to the DNS name in the question section of the query; and
  sending a response to the query to the requesting entity which belongs to the computer system only if a locally known answer to the query does not appear in the list of known answers in the query, so that the requesting entity can update the list of known answers to include the locally known answer;
  wherein responses to the requesting entity including known answers are suppressed, wherein the known answers are in the query from the requesting entity.

6. The method of claim 5, wherein the domain comprises a computer network.

7. The method of claim 5, wherein the domain comprises a wireless computer network.

8. A non-transitory computer-readable storage medium storing instructions that when executed by a computer cause the computer to perform a method to obtain information that is represented using DNS resource records, at a requesting entity in a domain, the method comprising:
  multicasting a DNS request query asking for information identified by a DNS name, a query type and a query class as defined in IETF RFC 1035, wherein the query includes:
    a question section containing the DNS name, the query type and the query class,
      wherein the query type indicates that the information contained in the query is of one of the following types:
        a host address,
        a canonical name of an alias,
        a CPU and OS used by a host,
        a mail exchange for the domain,
        an authoritative name server for the domain,
        a pointer to another part of the domain name space, or
        a start of the zone authority, and
      wherein the query class indicates a network protocol family or an instance of a network protocol,
    a non-empty answer section containing at least one answer to the request query known by the requesting entity, wherein the list of known answers includes known addresses which correspond to the DNS name in the question section of the request query;
  receiving responses to the multicast query that contain additional answers that are not in the list of known answers, wherein the list of known answers is in the request query, and wherein a responding entity suppresses responses to queries that contain answers that are included in the list of known answers in the query; and
  adding the additional answers to the list of known answers;
  wherein sending the list of known answers along with the request query suppresses the known answers in the received responses.

9. The computer-readable storage medium of claim 8, wherein multicasting the request query involves performing a domain name system (DNS) multicast to send the request query to multiple entities.

10. The computer-readable storage medium of claim 8, wherein the domain comprises a computer network.

11. The computer-readable storage medium of claim 8, wherein the domain comprises a wireless computer network.

12. A non-transitory computer-readable storage medium storing instructions that when executed by a computer cause the computer to perform a method to communicate information that is represented using DNS resource records, by a responding entity in a domain, the method comprising:
  receiving a multicast DNS request query from a requesting entity asking for information identified by a DNS name, a query type and a query class as defined in IETF RFC 1035, wherein the query includes:
    a question section containing the DNS name, the query type and the query class,
      wherein the query type indicates that the information contained in the query is of one of the following types:
        a host address,
        a canonical name of an alias,
        a CPU and OS used by a host,
        a mail exchange for the domain,
        an authoritative name server for the domain,
        a pointer to another part of the domain name space, or
        a start of the zone authority, and
      wherein the query class indicates a network protocol family or an instance of a network protocol,
    non-empty answer section containing at least one answer to the request query known by the requesting entity, wherein the list of known answers includes known addresses which correspond to the DNS name in the question section of the request query; and
  sending a response to the multicast request query to the requesting entity only if a locally known answer to the request query does not appear in the list of known answers in the query, so that the requesting entity can update the list of known answers to include the locally known answer;

wherein responses to the requesting entity including the known answers in the request query from the requesting entity are suppressed.

13. The computer-readable storage medium of claim 12, wherein the domain comprises a computer network.

14. The computer-readable storage medium of claim 12, wherein the domain comprises a wireless computer network.

15. An apparatus at a requesting entity in a domain that obtains information that is represented using DNS resource records, comprising:
   a querying mechanism configured to multicast a DNS request query asking for information identified by a DNS name, a query type and a query class as defined in IETF RFC 1035, wherein the query includes:
      a question section containing the DNS name, the query type and the query class as defined in IETF RFC 1035,
         wherein the query type indicates that the information contained in the query is of one of the following types:
            a host address,
            a canonical name of an alias,
            a CPU and OS used by a host,
            a mail exchange for the domain,
            an authoritative name server for the domain,
            a pointer to another part of the domain name space, or
            a start of the zone authority, and
         wherein the query class indicates a network protocol family or an instance of a network protocol,
      a non-empty answer section containing at least one answer to the request query known by the requesting entity, wherein the list of known answers includes known addresses which correspond to the DNS name in the question section of the request query;
   a receiving mechanism configured to receive responses to the multicast request query that contain additional answers that are not in the list of known answers, wherein the list of known answers is in the request query sent, and wherein a responding entity suppresses responses to queries that contain answers that are included in the list of known answers in the query; and
   an updating mechanism that is configured to add the additional answers to the list of known answers;
   wherein sending the list of known answers along with the request query suppresses the known answers in the received responses.

16. The apparatus of claim 15, wherein the querying mechanism is configured to perform a domain name system (DNS) multicast to send the request query to multiple entities.

17. The apparatus of claim 15, wherein the domain comprises a computer network.

18. The apparatus of claim 15, wherein the domain comprises a wireless computer network.

19. An apparatus at a responding entity in a domain that communicates information that is represented using DNS resource records, comprising:
   a receiving mechanism configured to receive a multicast DNS request query from a requesting entity asking for information identified by a DNS name, a query type and a query class as defined in IETF RFC 1035, wherein the query includes:
      a question section containing the DNS name, the query type and the query class as defined in IETF RFC 1035,
         wherein the query type indicates that the information contained in the query is of one of the following types:
            a host address,
            a canonical name of an alias,
            a CPU and OS used by a host,
            a mail exchange for the domain,
            an authoritative name server for the domain,
            a pointer to another part of the domain name space, or
            a start of the zone authority, and
         wherein the query class indicates a network protocol family or an instance of a network protocol,
      a non-empty answer section containing at least one answer to the request query known by the requesting entity, wherein the list of known answers includes known addresses which correspond to the DNS name in the question section of the request query; and
   a response mechanism that is configured to send a response to the multicast request query to the requesting entity only if a locally known answer to the request query does not appear in the list of known answers in the query, so that the requesting entity can update the list of known answers to include the locally known answer;
   wherein responses to the requesting entity including the known answers in the request query from the requesting entity are suppressed.

20. The apparatus of claim 19, wherein the domain comprises a computer network.

21. The apparatus of claim 19, wherein the domain comprises a wireless computer network.

22. A computer-executable method, at a requesting entity, to discover service responding entities that are available within a domain, comprising:
   multicasting a DNS request query from a computer system asking for service responding entities that are available within the domain, wherein the request query including a question section, and a non-empty answer section containing at least one answer to the request query known by the requesting entity, wherein the list of known answers includes known addresses which correspond to a DNS name in the question section of the request query; receiving at the computer system only responses that contain changes to the list of known service responding entities, wherein the list of known service responding entities is in the request query sent, and wherein a responding entity suppresses responses to queries that contain known service responding entities that are included in the list of known service responding entities in the query; and
   using the changes to update the list of known service responding entities;
   wherein sending the list of known service responding entities along with the request query suppresses those responses that include the known service responding entities in the request query.

23. The method of claim 22, wherein multicasting the request query involves performing a domain name service (DNS) multicast to send the request query to multiple entities.

24. The method of claim 22, further comprising using a name of a service responding entity to lookup an address for the service responding entity.

25. The method of claim 22, wherein the domain comprises a computer network.

26. The method of claim 22, wherein the domain comprises a wireless computer network.

27. A non-transitory computer-readable storage medium storing instructions that when executed by a computer cause the computer to perform a method, at a requesting entity, to discover service responding entities that are available within a domain, the method comprising:
- multicasting a DNS request query asking for service responding entities that are available within the domain, wherein the query includes a question section, and a non-empty answer section containing at least one answer to the request query known by the requesting entity, wherein the list of known answers includes known addresses which correspond to a DNS name in the question section of the request query;
- receiving only responses that contain changes to the list of known service responding entities, wherein the list of known service responding entities is in the request query sent, and wherein a responding entity suppresses responses to queries that contain known service responding entities that are included in the list of known service responding entities in the query; and
- using the changes to update the list of known service responding entities;
- wherein sending the list of known service responding entities along with the request query suppresses those responses that include the known service responding entities in the request query.

28. The computer-readable storage medium of claim 27, wherein multicasting the request query involves performing a domain name service (DNS) multicast to deliver the request query to multiple entities.

29. The computer-readable storage medium of claim 27, further comprising using a name of a service responding entity to lookup an address for the service responding entity.

30. The computer-readable storage medium of claim 27, wherein the domain comprises a computer network.

31. The computer-readable storage medium of claim 27, wherein the domain comprises a wireless computer network.

32. An apparatus, at a requesting entity, to discover service responding entities that are available within a domain, comprising:
- a querying mechanism configured to multicast a DNS request query asking for service responding entities that are available within the domain, wherein the query includes a question section, and a non-empty answer section containing at least one answer to the request query known by the requesting entity, wherein the list of known answers includes known addresses which correspond to a DNS name in the question section of the request query;
- a receiving mechanism configured to receive only those responses that contain changes to the list of known service responding entities, wherein the list of known service responding entities is in the request query, and wherein a responding entity suppresses responses to queries that contain known service responding entities that are included in the list of known service responding entities in the query; and
- an update mechanism to use the changes to update the list of known service responding entities;
- wherein sending the list of known service responding entities along with the request query suppresses those responses that include the known service responding entities in the request query.

33. The apparatus of claim 32, wherein the querying mechanism is configured to performing a domain name service (DNS) multicast to send the request query to the multiple entities.

34. The apparatus of claim 32, wherein the apparatus is configured to use a name of a service responding entity to lookup an address for the service responding entity.

35. The apparatus of claim 32, wherein the domain comprises a computer network.

36. The apparatus of claim 32, wherein the domain comprises a wireless computer network.

37. A computer-executable method to communicate about service responding entities that are available in a domain, by a responding entity in the domain, comprising:
- receiving a multicast DNS request query from a requesting entity belongs to a computer system asking for service responding entities that are available within the domain, wherein the query includes a question section, and a non-empty answer section containing at least one answer to the request query known by the requesting entity, wherein the list of known answers includes known addresses which correspond to a DNS name in the question section of the request query; and
- sending a response to the multicast request query to the requesting entity belongs to the computer system only if a locally known service responding entity does not appear in the list of known service responding entities, so that the requesting entity can update the list of known service responding entities to include the locally known service responding entity;
- wherein responses to the requesting entity including known service responding entities are suppressed, wherein the known service responding entities are in the request query from the requesting entity.

38. The method of claim 37, wherein the domain comprises a computer network.

39. The method of claim 37, wherein the domain comprises a wireless computer network.

40. A non-transitory computer-readable storage medium storing instructions that when executed by a computer cause the computer to perform a method to communicate about service responding entities that are available in a domain, by a responding entity in the domain, comprising:
- receiving a multicast DNS request query from a requesting entity asking for service responding entities that are available within the domain, wherein the request query includes a question section, and a non-empty answer section containing a least one answer to the request query known by the requesting entity, wherein the list of known answers includes known addresses which correspond to a DNS name in the question section of the request query; and
- sending a response to the multicast request query to the requesting entity only if a locally known service responding entity does not appear in the list of known service responding entities, so that the requesting entity can update the list of known service responding entities to include the locally known service responding entity;
- wherein responses to the requesting entity including known service responding entities are suppressed, wherein the known service responding entities are in the request query from the requesting entity.

41. The computer-readable storage medium of claim 40, wherein the domain comprises a computer network.

42. The computer-readable storage medium of claim 40, wherein the domain comprises a wireless computer network.

43. An apparatus at a responding entity in a domain that communicates about service responding entities that are available in the domain, comprising:
  a receiving mechanism configured to receive a multicast DNS request query from a requesting entity asking for service responding entities that are available in the domain, wherein the query includes a question section, and a non-empty answer section containing at least one answer to the request query known by the requesting entity, wherein the list of known answers includes known addresses which correspond to a DNS name in the question section of the request query; and
  a sending mechanism configured to send a response to the multicast request query to the requesting entity only if a locally known service responding entity does not appear in the list of known service responding entities, so that the requesting entity can update the list of known service responding entities to include the locally known service responding entity;
  wherein responses to the requesting entity including known service responding entities are suppressed, wherein the known service responding entities are in the request query from the requesting entity.

44. The apparatus of claim 43, wherein the domain comprises a computer network.

45. The apparatus of claim 43, wherein the domain comprises a wireless computer network.

46. A method for obtaining information that is represented using DNS resource records, comprising:
  delivering a query to at least one responding entity from a requesting entity asking for information identified by a DNS name, a query type and a query class, wherein the query is contained within a packet that adheres to a format defined in Internet Engineering Task Force RFC 1035;
  wherein delivering the query involves including a non-empty list of answers to the query known by the requesting entity in an answer section of the query, wherein the list of known answers in the query includes at least one answer to previous queries received by the requesting entity from the at least one responding entity or from a different responding entity;
  receiving from the at least one responding entity at the requesting entity only responses to the query that contain additional answers that are not in the list of known answers, wherein the responding entity suppresses responses to queries that contain answers that are included in the list of known answers in the query; and
  adding any received additional answers to the list of known answers at the requesting entity.

47. The method of claim 46, wherein delivering the query involves performing a domain name system (DNS) multicast to simultaneously deliver the query to multiple responding entities.

48. A method for communicating information that is represented using DNS resource records, comprising:
  receiving a query from a requesting entity at a responding entity asking for information identified by a DNS name, a query type and a query class, wherein the query is contained within a packet that adheres to a format defined in Internet Engineering Task Force RFC 1035;
  wherein receiving the query involves receiving in the query a non-empty list of answers to the query known by the requesting entity, and wherein the list of known answers in the query includes at least one answer to previous queries received by the requesting entity from the responding entity or from a different responding entity; and
  sending a response to the query to the requesting entity only if a locally known answer to the query does not appear in the list of known answers in the query and otherwise suppressing responses to queries that contain answers that are included in the list of known answers in the query.

49. A non-transitory computer-readable storage medium storing instructions that when executed by a computer cause the computer to perform a method for obtaining information that is represented using DNS resource records, the method comprising:
  delivering a query to at least one responding entity from a requesting entity asking for information identified by a DNS name, a query type and a query class, wherein the query is contained within a packet that adheres to a format defined in Internet Engineering Task Force RFC 1035;
  wherein delivering the query involves including a non-empty list of answers to the query known by the requesting entity in an answer section of the query, wherein the list of known answers in the query includes at least one answer to previous queries received by the requesting entity from the at least one responding entity or from a different responding entity;
  receiving from the at least one responding entity at the requesting entity only responses to the query that contain additional answers that are not in the list of known answers, wherein the responding entity suppresses responses to queries that contain answers that are included in the list of known answers in the query; and
  adding any received additional answers to the list of known answers at the requesting entity.

50. The computer-readable storage medium of claim 49, wherein delivering the query involves performing a domain name system (DNS) multicast to simultaneously deliver the query to multiple responding entities.

51. A non-transitory computer-readable storage medium storing instructions that when executed by a computer cause the computer to perform a method for communicating information that is represented using DNS resource records, the method comprising:
  receiving a query from a requesting entity at a responding entity asking for information identified by a DNS name, a query type and a query class, wherein the query is contained within a packet that adheres to a format defined in Internet Engineering Task Force RFC 1035;
  wherein receiving the query involves receiving in the query a non-empty list of answers to the query known by the requesting entity, and wherein the list of known answers in the query includes at least one answer to previous queries received by the requesting entity from the responding entity or from a different responding entity; and
  sending a response to the query to the requesting entity only if a locally known answer to the query does not appear in the list of known answers in the query and otherwise suppressing responses to queries that contain answers that are included in the list of known answers in the query.

52. An apparatus that obtains information that is represented using DNS resource records, comprising:
  a delivery mechanism that is configured to deliver a query to at least one responding entity from a requesting entity asking for information identified by a DNS name, a query type and a query class, wherein the query is contained within a packet that adheres to a format defined in Internet Engineering Task Force RFC 1035;

wherein when delivering the query, the delivery mechanism is further configured to include a non-empty list of answers to the query known by the requesting entity in an answer section of the query, wherein the list of known answers in the query includes at least one answer to previous queries received by the requesting entity from the at least one responding entity or from a different responding entity;

a receiving mechanism that is configured to receive from the at least one responding entity at the requesting entity only responses to the query that contain additional answers that are not in the list of known answers, wherein the responding entity suppresses responses to queries that contain answers that are included in the list of known answers in the query; and an updating mechanism that is configured add any received additional answers to the list of known answers at the requesting entity.

53. The apparatus of claim 52, wherein the delivery mechanism is configured to perform a domain name system (DNS) multicast to deliver the query to the multiple entities.

54. An apparatus that communicates information that is represented using DNS resource records, comprising:

a receiving mechanism that is configured to receive a query from a requesting entity at a responding entity asking for information identified by a DNS name, a query type and a query class, wherein the query is contained within a packet that adheres to a format defined in Internet Engineering Task Force RFC 1035;

wherein when receiving the query, the receiving mechanism is configured to receive in the query a non-empty list of answers to the query known by the requesting entity, wherein the list of known answers in the query includes at least one answer to previous queries received by the requesting entity from the responding entity or from a different responding entity; and a response mechanism configured to send a response to the query to the requesting entity only if a locally known answer to the query does not appear in the list of known answers in the query and otherwise suppressing responses to queries that contain answers that are included in the list of known answers in the query.

* * * * *

UNITED STATES PATENT AND TRADEMARK OFFICE
CERTIFICATE OF CORRECTION

PATENT NO.        : 9,998,321 B2
APPLICATION NO.   : 10/102174
DATED             : June 12, 2018
INVENTOR(S)       : Stuart D. Cheshire Page 1 of 1

It is certified that error appears in the above-identified patent and that said Letters Patent is hereby corrected as shown below:

In the Claims

In Column 6, Line 57, replace "non-empty answer section" with --and a non-empty answer section--.

In Column 8, Line 40, replace "including a question section" with --includes a question section--.

In Column 10, Line 16, replace "belongs to the computer system" with --belonging to the computer system--.

In Column 10, Line 26, replace "belongs to the computer system" with --belonging to the computer system--.

In Column 13, Line 19, replace "configured add" with --configured to add--.

Signed and Sealed this
Eighteenth Day of December, 2018

Andrei Iancu
*Director of the United States Patent and Trademark Office*